United States Patent [19]

Bell et al.

[11] Patent Number: 5,494,071
[45] Date of Patent: Feb. 27, 1996

[54] MOUNTING SYSTEM FOR PRESSURE TRANSMITTERS

[75] Inventors: Joel D. Bell, Katy; Alan F. Chou, Sugarland, both of Tex.

[73] Assignee: Keystone International Holdings Corp., Houston, Tex.

[21] Appl. No.: 253,764

[22] Filed: Jun. 3, 1994

[51] Int. Cl.$^6$ .................................................. F16L 23/00
[52] U.S. Cl. ........................................ 137/597; 137/884
[58] Field of Search ................................. 137/597, 884

[56] References Cited

U.S. PATENT DOCUMENTS

| | | | |
|---|---|---|---|
| 3,025,878 | 3/1962 | Hupp | 137/884 X |
| 3,654,960 | 4/1972 | Kierman | 137/884 |
| 5,036,884 | 8/1991 | Miller et al. | 137/597 |

OTHER PUBLICATIONS

Precision General, Inc. brochure, pp. 1–6.

*Primary Examiner*—Jonn C. Fox
*Attorney, Agent, or Firm*—Vaden, Eickenroht, Thompson & Feather

[57] ABSTRACT

A mounting plate is disclosed that is adapted to be positioned between a main flow line and at least two differential pressure transmitters, to place the two differential pressure transmitters in fluid communication with a pair of pipeline taps on opposite sides of a flow reducing orifice plate in the main flow line is disclose. The mounting plate includes a plate-like body generally rectangular in cross section along its longitudinal axis and longer than it is wide along its transverse axis. The plate-like body includes a pair of ports that extend through the body and are in fluid communication with the pair of pressure taps with the longitudinal axis of the body parallel to the main flow line. A plurality of passageways or bores extend into the body to connect the ports to various combinations of pressure transmitters. One or more mounting holes for the transmitters are on a line that intersects the longitudinal axis of the body at an angle to allow some of the passageways or bores to be drilled straight and parallel to the longitudinal axis of the body between the mounting holes.

In another embodiment, a sub plate is used to supply pressure to a third pressure transmitter. In another embodiment, a plate-like adapter, as well as the sub plate, is used to mount four differential transmitters or three differential pressure transmitters and a static pressure transmitter.

1 Claim, 4 Drawing Sheets

MOUNTING SYSTEM FOR PRESSURE TRANSMITTERS

This invention relates generally to mounting systems for fluid pressure transmitters that transmit the static pressure that is upstream or downstream of an orifice meter run and the differential pressure across the orifice meter run to a central station where the volume of gas flowing through the pipeline is calculated. In particular, this invention relates to a common mounting means for the pressure transmitters.

In U.S. Pat. No. Re. 34,610, which will issue May 17, 1994 and be entitled "Mounting Means for Fluid Pressure Transmitters", a common mounting means for a differential pressure transmitter and a gauge pressure transmitter is disclosed. It consists of a plate-like mounting adapter having two parallel ports located along a line transverse the longitudinal axis of the adapter and extending through it from one side to the other. The adapter is mounted on a manifold through which the pressure upstream of the orifice meter run and the pressure downstream of the orifice meter run is transmitted through the ports in the adapter to a differential pressure transmitter mounted on the adapter. A passageway in the adapter extending parallel to the longitudinal axis of the adapter connects one of the two ports to a static pressure transmitter also mounted on the top side of the adapter. The adapter can be easily provided with a second longitudinal passageway so that a second differential pressure transmitter can be mounted on the plate, if desired.

The location of the two openings or ports in the plate-like adapter through which the upstream and downstream pressures are transmitted to the differential pressure transmitter are so located on the adapter that the axis of the longitudinally extending passageway connecting the static pressure transmitter to the ports is perpendicular to the pipeline, as would be the second longitudinally extending passageway required for a differential pressure transmitter, when the adapter is mounted on a manifold that connects the ports to upstream and downstream pressure. See FIG. 2 of U.S. Pat. No. Re. 34,610. This results because the pressure taps on opposite sides of the orifice are in line with the longitudinal axis of the meter run and the manifold is designed so that the pressures upstream and downstream of the orifice are transmitted to the pressure transmitter along as straight a path as possible so that pressure changes in the pipeline will be transmitted to the transmitters accurately and quickly. As a consequence, the adapter of the '884 patent, when mounted on the manifold, has its longitudinal axis perpendicular to the longitudinal axis of the meter run.

More and more people in the industry now want two or more differential pressure transmitters for each orifice meter run. This provides backup differential pressure transmitters and also a check on the information being received. Also, there may be as many as four parties that are interested in measuring the volume of gas flowing through the line and each party wants its own pressure transmitter.

As stated above, the plate-like mounting adapter of the '884 patent could be easily modified to support and to supply two differential pressure transmitters with upstream and downstream pressure by providing a second passageway extending parallel to the first such passageway to connect another outlet port with whichever pressure is not supplied to first outlet port.

The problem, however, as stated above, is that the arrangement of the ports causes the plate-like adapter to extend laterally of the pipeline far enough to accommodate the second differential pressure transmitter, which creates a problem when multiple meter runs are located side-by-side.

It is also desirable to mount the two differential pressure transmitters utilizing such an adapter of minimal size to reduce the space requirement and overall costs associated with the transmitters.

Therefore, it is an object and feature of this invention to provide a plate-like mounting adapter for at least two differential pressure transmitters that can be mounted on a manifold or connected directly to the pipeline with the longitudinal axis of the adapter parallel to the longitudinal axis of the pipeline.

A further object and advantage of this invention is to provide such a plate-like mounting adapter that can support a gauge pressure transmitter in addition to two differential pressure transmitters with the passageway supplying pressure to the gauge pressure transmitter generally parallel to the pipeline.

It is another object and feature of this invention to provide such an adapter that is easily manufactured and small in size.

It is another object and feature of this invention to provide a plate-like mounting adapter for at least two differential pressure transmitters providing a common mounting means that is rectangular in shape with two ports, through which the pressures upstream and downstream of the orifice meter run are transmitted to the pressure transmitters that are generally centrally located and spaced generally along a longitudinal axis of the adapter thereby allowing the adapter to be positioned with its longitudinal axis parallel to the pipeline.

It is another object of the invention to provide means for mounting a second differential pressure transmitter on such an adapter to be supplied with upstream and downstream pressure using mounting holes located along a line that makes an acute angle with the longitudinal axis of the adapter thereby allowing longitudinally extending straight passageways to supply upstream and downstream pressure to the transmitter.

It is a further object of this invention to provide a mounting plate and a sub plate assembly that provides a common mounting means for three differential pressure transmitters.

It is a further object of this invention to provide a mounting plate that can be mounted on a manifold upon which three pressure transmitters can be mounted along a line parallel to the longitudinal axis of the pipeline.

It is a further object and advantage of this invention to provide a second plate-like adapter for mounting on the mounting adapter sub plate assembly to support one of the three differential pressure transmitters mounted on the adapter plate and a fourth pressure differential pressure transmitter or a static pressure transmitter.

These and other advantages, features of this invention will be apparent to those skilled in the art from a consideration of this specification including the attached drawings and appended claims.

IN THE DRAWINGS

Figure 1:
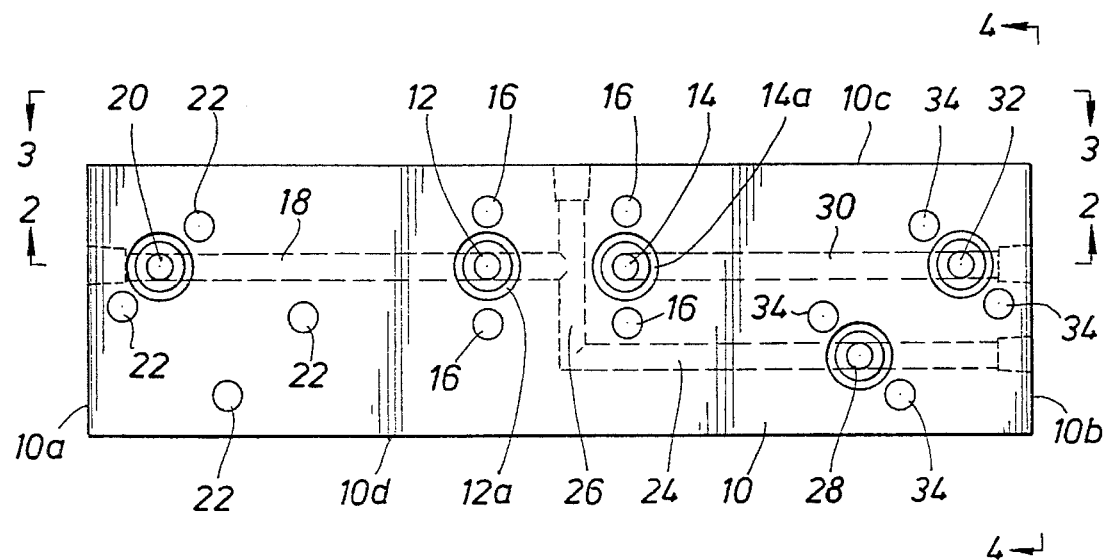
FIG. 1 is a plan view of one embodiment of the platelike adapter of this invention for supporting two differential pressure transmitters and a gauge pressure transmitter.
Figure 2:
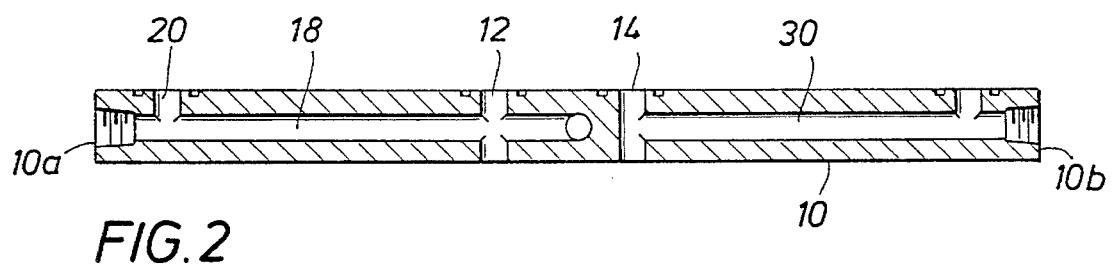
FIG. 2 is a sectional view taken along line 2—2 of FIG. 1.
Figure 3:
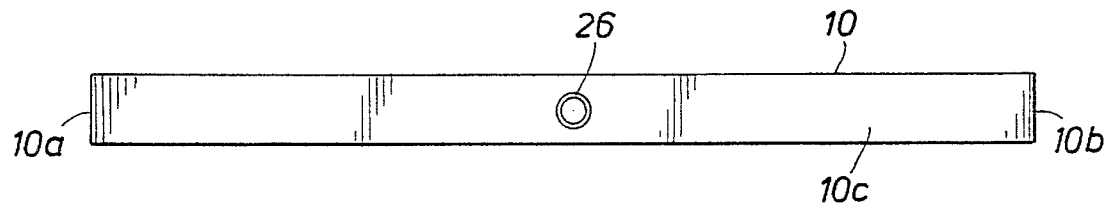
FIG. 3 is a sectional view taken along line 3—3 of FIG. 1.
Figure 4:
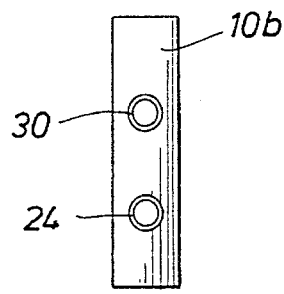
FIG. 4 is an end view of the adapter of FIG. 1 looking in the direction of arrows 4—4.
Figure 5:
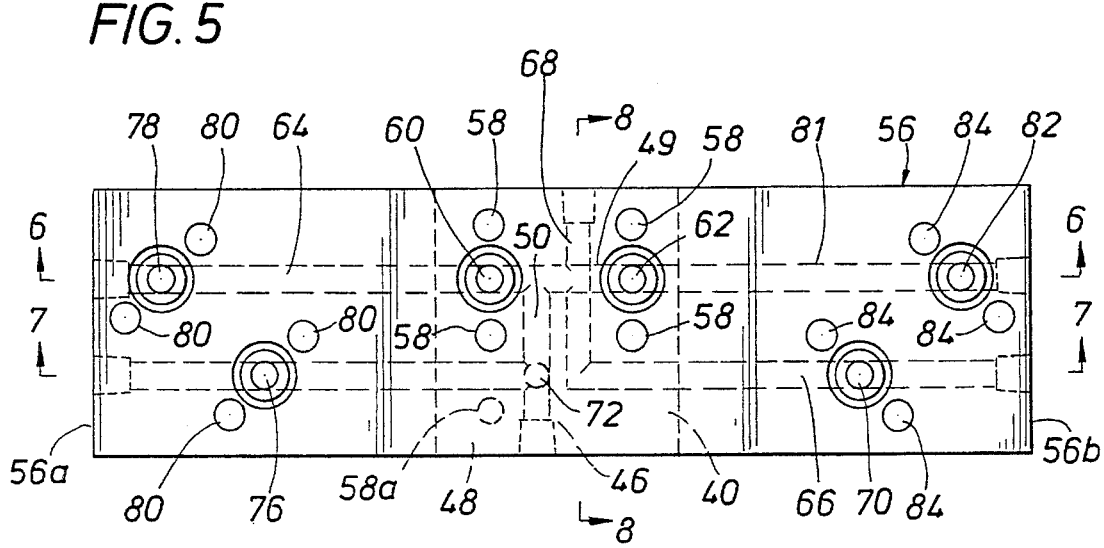
FIG. 5 is a plan view of another embodiment of the plate-like mounting adapter of this invention for supporting three differential pressure transmitters.

In FIGS. 1–4, rectangular plate 10 is provided with a pair of centrally located ports 12 and 14 that extend through the plate. All such "ports" are surrounded by circular grooves, such as grooves 12a and 14a, in which seal rings are placed to contain the fluid pressure in the ports.

When plate 10 is mounted on a manifold (not shown), upstream and downstream pressure on opposite sides of an orifice meter run is supplied to the ports, substantially directly from the pipeline so that there is a minimum resistance to the transmission of pressure changes through the manifold to the ports and to the transmitters. A differential pressure transmitter mounted on the mounting adapter using mounting holes 16 measures the difference between upstream and downstream pressure across the orifice and transmits this information to a central station.

The adapter also has a straight first bore or passageway 18 extending from end 10a of the plate parallel to the longitudinal axis of the plate to intersect port 12. Assuming port 12 is supplied with downstream pressure this pressure is supplied to port 20 through passageway 18. A gauge pressure transmitter mounted on the adapter using mounting holes 22 transmits upstream or downstream pressure, whichever is in port 12, to the central station.

The adapter is further provided with second straight bore or passageway 24 that extends from end 10b of the adapter parallel to the longitudinal axis of the adapter. Bore 24 intersects third passageway 26 that extends transverse the longitudinal axis of the adapter from side 10c of the adapter and intersects bore 18 as well as passageway 24. This connects port 12 to opening 28 and allows downstream pressure to be supplied to port 28.

A fourth straight passageway 30 extends from end 10b of the adapter and connects opening 32 with port 14 to supply upstream pressure to opening 32. A second differential pressure transmitter can then be mounted on the adapter using mounting holes 34, and it will be supplied with upstream and downstream pressure relative to the orifice plate through openings 28 and 32. Using this embodiment of the common mounting adapter of this invention allows two pressure differential transmitters and a static or gauge pressure transmitter to be connected directly to the pressure taps on opposite sides of an orifice meter run or to a manifold connected to an orifice meter run with the longitudinal axis of the adapter parallel to the longitudinal axis of the pipeline.

Figure 6:
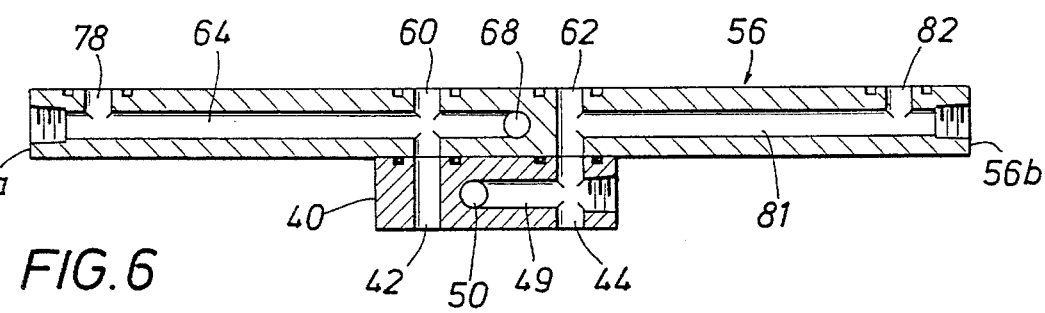
FIG. 6 is a sectional view taken along line 6—6 of FIG. 5.
Figure 7:
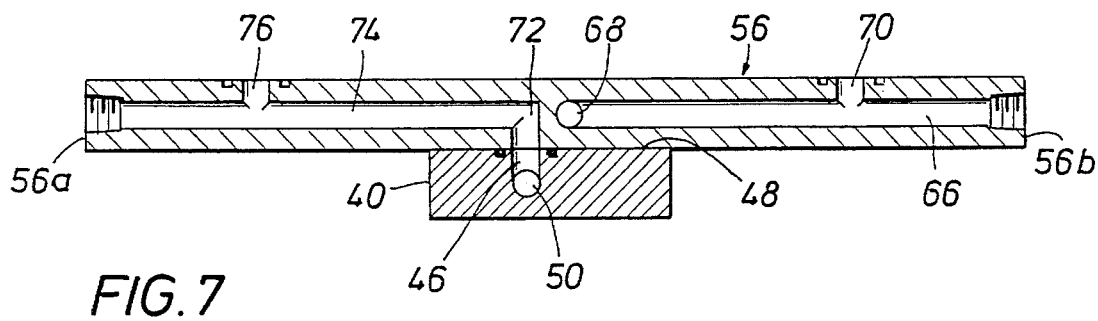
FIG. 7 is a sectional view taken along line 7—7 of FIG. 5.

FIGS. 5–8 show a mounting adapter assembly for mounting, in parallel alignment with a pipeline, three differential pressure transmitters. The assembly includes mounting plate 56 and sub plate 40. Sub plate 40 has three vertical ports 42, 44, and 46. Ports 42 and 44 extend through the sub plate, but port 46 does not. Port 46 is a blind hole opening in upper surface 48 of the sub plate. Port 44 is connected to port 46 by passageways 49 and 50 that intersect at right angles as shown in FIG. 6. Sub plate 40 is positioned on a manifold (not shown) with ports 42 and 44 positioned to receive from the manifold the upstream and downstream pressure from opposite sides of an orifice plate in a pipeline.

Figure 8:
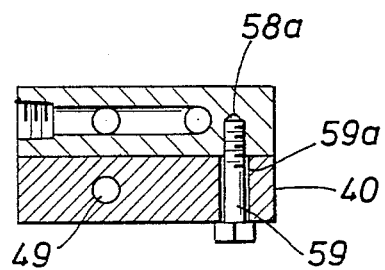
FIG. 8 is a sectional view taken along line 8—8 of FIG. 5.

Elongated rectangular plate-like mounting adapter 56 (mounting plate or plate) is then mounted on sub plate 40 with mounting holes 58 in axial alignment with mounting holes 52 of the sub plate. Mounting bolts (not shown) extend through aligned mounting holes 58 in the plate and 52 in the sub plate, as shown in FIG. 8, to connect the assembly together and to the manifold (not shown). Since mounting holes 58 are offset from the centerline of the plate, drilled and tapped hole 58a extends upwardly from the bottom of the plate to receive bolt 59 extending through hole 59a in the sub plate to help pull the mounting plate and sub plate together. Upstream and downstream pressure is now supplied to ports 60 and 62 of the mounting plate through ports 42 and 44 and a differential pressure transmitter can be mounted to receive upstream/downstream pressure through ports 60 and 62 using mounting holes 58.

Plate 56 has straight bore or passageway 64 that extends from end 56a parallel to the longitudinal axis of the plate and intersects port 60. Second straight passageway 66 extends from end 56b parallel to the longitudinal axis of the plate and intersects transverse passageway 68 that intersects longitudinally extending passageway 64. Thus, passageways 64, 66, and 68 connect ports 70 and 78 with port 60, thereby, supplying ports 70 and 78, as well as port 60, with pressure from one side of the orifice plate.

Pressure from the other side of the orifice plate is supplied to port 44 in the sub plate 40 and then to port 46 of the sub plate by passageways 49 and 50. Port 46 then supplies such pressure to port 72 in plate 56 and port 76 through passageway 74 that extends from end 56a parallel to passageway 64 and intersects vertical outlet port 76 and port 72. Thus, port 76 and port 78, which is supplied with upstream pressure by passageway 64, furnish upstream and downstream pressure to a second differential pressure transmitter mounted on the plate through mounting holes 80.

Passageway or bore 81 connects port 82 to downstream pressure port 62 so that a third differential pressure transmitter can be mounted to receive upstream pressure from port 70 and downstream pressure from port 82 using mounting holes 84.

The mounting plate and the sub plate shown in FIGS. 5–8 can be integrally connected.

Figure 9:
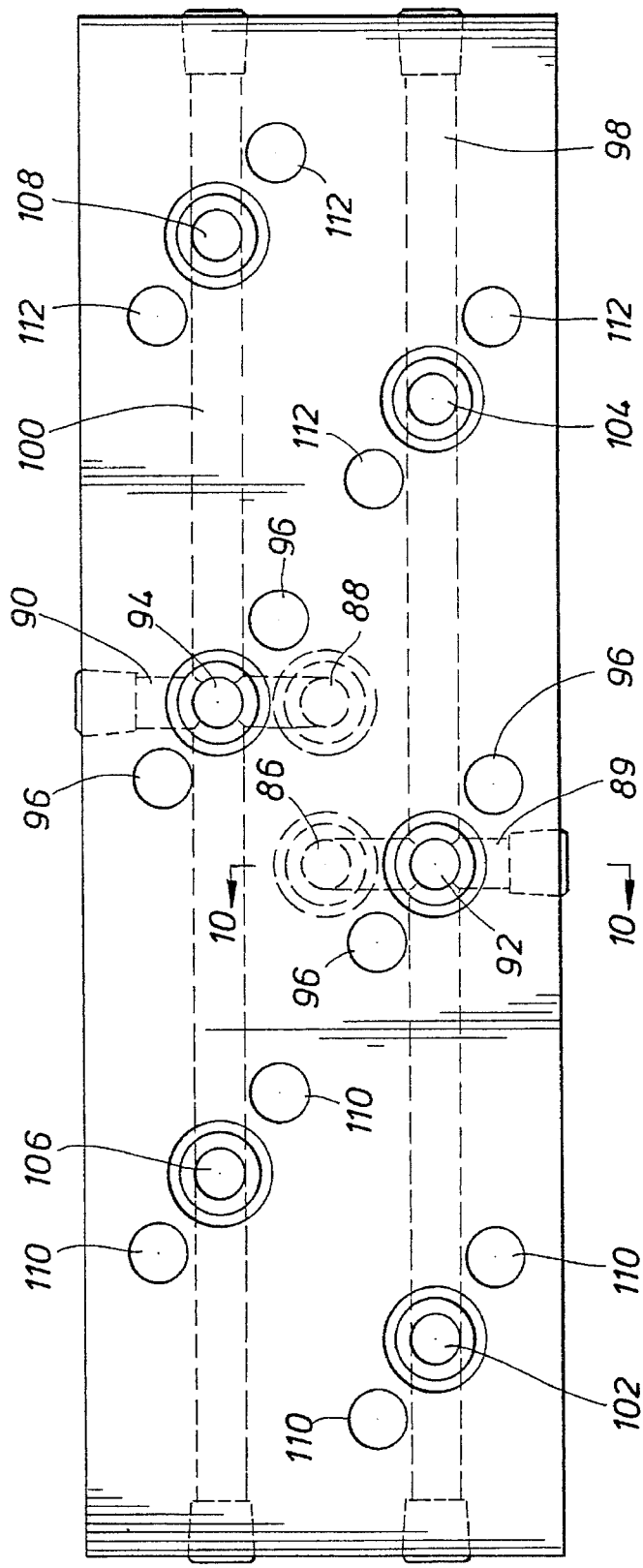
FIG. 9 is a plan view of an alternate embodiment of the plate-like mounting adapter of this invention for supporting three differential pressure transmitters all of which being supplied by upstream and downstream pressure through passageways extending straight through the plate from one end to the other.
Figure 10:
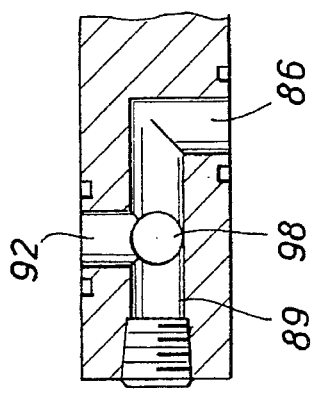
FIG. 10 is a sectional view taken along line 10—10 of FIG. 9.

In the embodiment shown in FIGS. 9 and 10, again the mounting plate is arranged to support three differential pressure transmitters. Upstream pressure and downstream pressure enter the plate through ports 86 and 88, respectively. These ports do not go all the way through the plate, as shown in FIG. 10 with respect to port 86, but are connected by transverse bores 89 and 90 to ports 92 and 94 that supply upstream and downstream pressure to a pressure transmitter mounted on the plate using mounting holes 96. Longitudinally extending passageway or bore 98 extends from one end of the plate to the other and intersects vertical ports 92, 102, and 104 to supply port 102 and 104 with upstream pressure. Passageway 100 extends from one end of the plate and intersects port 94, 106, and 108 to supply ports 106 and 108 with downstream pressure. Thus, upstream and downstream pressure is supplied to differential pressure transmitters mounted to the plate using mounting holes 110 and 112, respectively.

FIGS. 11–15 show sub plate 120 for mounting partly under on mounting adapter 56 that is shown in FIGS. 5–8 to allow three differential pressure transmitters plus either a fourth differential pressure or a static pressure transmitter to be mounted on sub plate 120.

Figure 11:
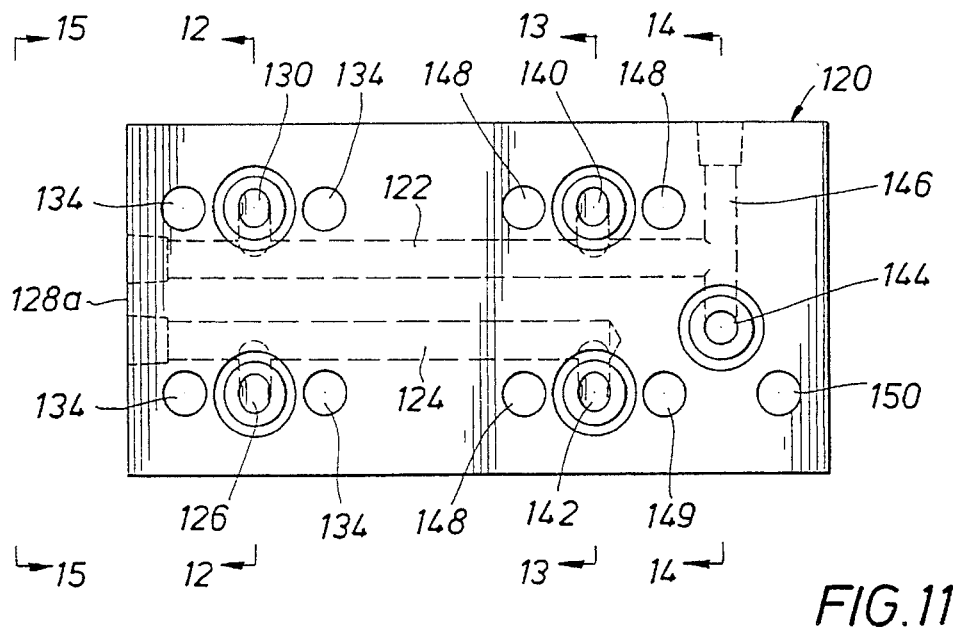
FIG. 11 is a plan view of a sub plate for mounting under an adapter, such as the plate-like adapter of FIG. 5, to provide support for additional pressure transmitters.
Figure 12:
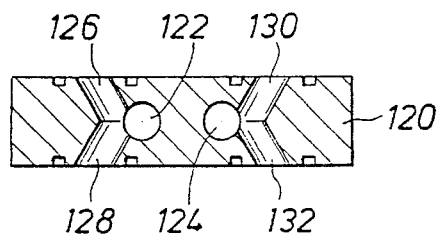
FIG. 12 is a sectional view taken along line 12—12 of FIG. 11.

Sub plate 120 as shown in FIGS. 11 and 12 has longitudinally extending passageways 122 and 124 that are bored from end 120*a* of the adapter plate. Ports 126 and 130 are drilled at an angle into the top side of plate 120 to intersect passageways 122 and 124 and ports 128 and 132 are drilled from the bottom of the plate to intersect passageways 122 and 124 as well as ports 126 and 130.

Figure 13:
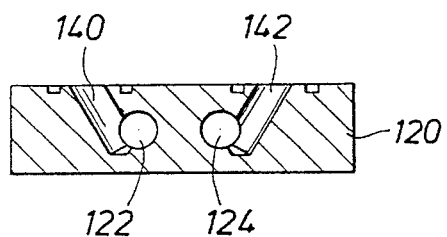
FIG. 13 is a sectional view taken along line 13—13 of FIG. 11.
Figure 14:
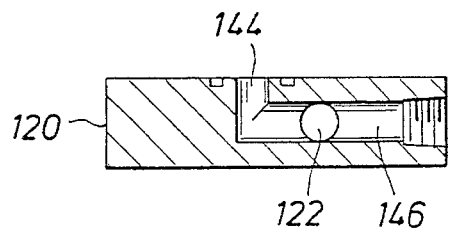
FIG. 14 is a sectional view taken along line 14—14 of FIG. 11.
Figure 15:
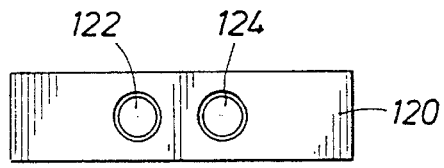
FIG. 15 is an end view of the adapter of FIG. 11 looking in the direction of arrows 15—15.

As shown in FIG. 13, port 140 is connected to passageway 122 and port 142 is connected to passageway 124. In FIG. 14, port 144 is connected to passageway 122 by laterally extending passageway 146 that connects passageway 122 to port 144.

When mounting adapter 56 is placed partly on adapter plate 120 and ports 60, 62, and 72 of adapter 56 are in axial alignment with ports 142, 140, and 144 respectively, pressure from one side of the orifice plate is supplied to sports 132 and 130 and port 140 through passageway 122 and port 144 through passageways 122 and 146. Port 140 of adapter plate 120 is connected upwards to port 62 of mounting adapter 56 and port 144 of adapter plate 120, then is connected to port 72 of mounting adapter 56 and eventually is connected to ports 76, 62, and 82 of the mounting adapter 56. Pressure from the other side of the orifice plate is supplied to ports 128 and 126 and port 142 through passageway 124. Port 142 of adapter 120 is connected upwards to port 60 of mounting adapter 56, from there, port 60 is connected to ports 78 and 70.

When mounting adapter 56 is placed partly on sub plate 120 and ports 60, 62, and 72 of mounting adapter 56 are in axial alignment with ports 142, 140, and 144 of sub plate 120 respectively, four mounting holes 148 in sub plate 120 also are in axial alignment with four mounting holes 58 in the mounting adapter 56. Four mounting bolts (not shown) extend through, aligned mounting holes 148 in the sub plate, mounting holes 58 in the mounting adapter, and similarly aligned mounting holes in the differential pressure transmitter (not shown) and manifold (not shown), to connect the assembly together. Ports 60 and 62 of mounting adapter will accommodate either a differential transmitter or a static pressure transmitter. If a static pressure transmitter is used, it is mounted on another plate (not shown) with only one communication passageway to either port 60 or 62 and using the same mounting holes 58 and 148. If a differential transmitter is used, it can be mounted directly on mounting plate 56 and in fluid communication with ports 60 and 62 using mounting holes 58 and 148. Mounting hole 58*a* on mounting plate 56 and mounting hole 150 on sub plate 120 are used as auxiliary mounting holes, a short bolt (not shown) using these two holes to insure the sealing integrity of port 72 in mounting plate 56 and port 144 in sub plate 120.

Two additional differential pressure transmitters can be installed on mounting plate 56, (using ports 76 and 78 with mounting holes 80 and ports 82 and 70 using mounting holes 84) and the fourth differential pressure transmitters can be installed on sub plate 120 (using ports 126 and 130 with mounting holes 134).

Thus, by using adapter 120 with mounting adapter 56, either three differential pressure transmitters and a static pressure transmitter can be supported on one common mounting plate or four differential pressure transmitters can be so supported.

It is a feature of this invention that pressure transmitters that are not in direct alignment with the pressure taps coming through the mounting plate are mounted on the plate so that the distance between the upstream pressure sensor of the transmitter and the pipeline and the distance between the downstream pressure sensor of the transmitter and the pipeline are the same if at all possible or if not, as close to being the same as possible.

It is another feature of this invention to mount all transmitters not in direct alignment with the pressure taps at an oblique angle to the longitudinal axis of the plate to allow straight bores to be drilled from the ends of the plates that will pass between the mounting bolt holes and intersect the pressure ports located between the mounting holes.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A mounting plate capable of supporting three pressure transmitters for measuring and transmitting the pressure drop across an orifice in a gas pipeline and the gauge pressure of the gas on one side of the orifice, said plate having a first centrally located vertical port extending through the plate for connecting one of the pressure differential transmitters to a passageway supplied with pipeline pressure from one side of the orifice plate and a second centrally located vertical port extending through the plate for connecting the same differential pressure transmitter to a passageway supplied with pipeline pressure from the other side of the orifice plate, a first passageway extending longitudinally from one end of the plate intersecting and extending beyond the first vertical port to supply pressure from the first vertical port to a gauge pressure transmitter mounted on the plate in fluid communication with the first longitudinal passageway, a second longitudinally extending passageway extending from the other end of the plate to a point laterally spaced from the end of the first longitudinal passageway, a third passageway drilled from one side of the plate connecting the first and second longitudinal passageway to supply the second longitudinal passageway with pressure from one side of the orifice for supplying said pressure to a second differential pressure transmitter mounted on the plate and in fluid communication with the second longitudinal passageway, and a fourth longitudinal passageway extending from the same end of the plate as the second passageway and parallel to the second to connect with the second vertical port and supply the second differential pressure transmitter with pressure from the other side of the orifice.

* * * * *